(12) United States Patent
Okahara et al.

(10) Patent No.: US 11,045,955 B2
(45) Date of Patent: Jun. 29, 2021

(54) ROBOT CONTROL DEVICE

(71) Applicant: Mitsubishi Electric Corporation, Chiyoda-ku (JP)

(72) Inventors: Takuya Okahara, Tokyo (JP); Koji Shiratsuchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 254 days.

(21) Appl. No.: 16/097,858

(22) PCT Filed: Apr. 28, 2017

(86) PCT No.: PCT/JP2017/017012
§ 371 (c)(1),
(2) Date: Oct. 31, 2018

(87) PCT Pub. No.: WO2017/203937
PCT Pub. Date: Nov. 30, 2017

(65) Prior Publication Data
US 2019/0134819 A1 May 9, 2019

(30) Foreign Application Priority Data
May 26, 2016 (JP) .............................. JP2016-105489

(51) Int. Cl.
*B25J 9/16* (2006.01)
*B25J 13/08* (2006.01)
*B25J 19/06* (2006.01)

(52) U.S. Cl.
CPC ............. *B25J 9/1694* (2013.01); *B25J 13/08* (2013.01); *B25J 13/088* (2013.01); *B25J 19/06* (2013.01)

(58) Field of Classification Search
CPC . B25J 9/1694; B25J 13/08; B25J 19/06; B25J 13/088
(Continued)

(56) References Cited

U.S. PATENT DOCUMENTS 8,315,735 B2 * 11/2012 Nihei ................... B25J 9/1676
700/245
9,211,646 B2 * 12/2015 Tsusaka ................ B25J 9/1687
(Continued)

FOREIGN PATENT DOCUMENTS

JP  2006-043862 A   2/2006
JP    4219870 B2    2/2009
(Continued)

OTHER PUBLICATIONS

International Search Report dated Jun. 13, 2017, in PCT/JP2017/017012, filed Apr. 28, 2017.
(Continued)

*Primary Examiner* — Jaime Figueroa
(74) *Attorney, Agent, or Firm* — Xsensus LLP

(57) ABSTRACT

A robot control device includes: a measuring unit to measure a robot control state indicative of a position and a posture of the robot; a work area setting unit to store, for each of work processes, a work area that is defined by work movement of the worker between a start and an end of each of the work processes and includes a space a body of the worker occupies and to set the work area corresponding to the work process currently carried out by the worker based on a signal specifying the work process currently carried out by the worker; and a robot command generator to generate a motion command for the robot based on the work area and the robot control state. The generator varies the command for the robot based on whether the robot is present in the work area.

12 Claims, 11 Drawing Sheets

(58) Field of Classification Search
USPC .................................................. 700/245, 253
See application file for complete search history.

(56) References Cited

U.S. PATENT DOCUMENTS

| | | | | |
|---|---|---|---|---|
| 9,427,871 | B2* | 8/2016 | Ciarelli | F16P 3/14 |
| 9,475,200 | B2* | 10/2016 | Schlaich | B25J 9/1674 |
| 9,962,836 | B2* | 5/2018 | Zunke | B25J 19/0095 |
| 10,345,788 | B2* | 7/2019 | Watanabe | G05B 19/4061 |
| 10,369,691 | B2* | 8/2019 | Yamazaki | B25J 9/0087 |
| 2008/0021597 | A1* | 1/2008 | Merte | F16P 3/147 700/255 |
| 2010/0179690 | A1* | 7/2010 | Matthias | B25J 9/1676 700/253 |
| 2010/0191372 | A1* | 7/2010 | Nihei | B25J 9/1676 700/245 |
| 2010/0198365 | A1* | 8/2010 | Kawabata | G01S 7/4817 700/12 |
| 2011/0184555 | A1 | 7/2011 | Kosuge et al. | |
| 2011/0190932 | A1* | 8/2011 | Tsusaka | B25J 13/08 700/254 |
| 2012/0173021 | A1* | 7/2012 | Tsusaka | B25J 9/1664 700/258 |
| 2014/0067121 | A1* | 3/2014 | Brooks | B25J 9/1676 700/255 |
| 2015/0209961 | A1* | 7/2015 | Komatsu | B25J 9/1676 700/255 |
| 2016/0129595 | A1* | 5/2016 | Gerio | B25J 13/088 700/255 |
| 2016/0243700 | A1* | 8/2016 | Naitou | B25J 9/1633 |
| 2017/0357242 | A1* | 12/2017 | Watanabe | B25J 9/1666 |
| 2017/0361457 | A1* | 12/2017 | Yamazaki | B25J 9/0087 |
| 2018/0043549 | A1* | 2/2018 | Su | B25J 9/1676 |
| 2018/0126555 | A1 | 5/2018 | Nakazato et al. | |
| 2019/0105779 | A1* | 4/2019 | Einav | B25J 9/1697 |

FOREIGN PATENT DOCUMENTS

| | | |
|---|---|---|
| JP | 2010-120139 A | 6/2010 |
| JP | 2014-18927 A | 2/2014 |
| JP | 2014-94428 A | 5/2014 |
| JP | 2015-230621 A | 12/2015 |
| WO | WO 2010/134603 A1 | 11/2010 |

OTHER PUBLICATIONS

Office Action dated Feb. 19, 2021, in corresponding Chinese patent Application No. 201780031483.3, 15 pages.

* cited by examiner

ROBOT CONTROL DEVICE

FIELD

The present invention relates to a device that controls a robot which operates while sharing a work space with a human.

BACKGROUND

Development of a human cooperation robot system that allows a worker and a robot to share a work space that is not partitioned by a safety fence has been underway in recent years. With the human cooperation robot system, the worker can possibly enter a movable range of the robot. For prevention of collision between the worker and the robot, a possibility of collision is judged on the basis of positions and speeds of the worker and the robot, and operation of the robot is restricted so as to stop in cases where the collision may take place, whereby safety is ensured. The closer the worker and the robot are to each other or the higher the speeds at which the worker and the robot move, the more likely the worker and the robot are to collide with each other. Accordingly, the operation of the robot ought to be restricted at a stage where the worker and the robot are farther from each other or move at lower speeds. However, stopping the operation, for collision prevention, whenever the robot and the worker come close to each other decreases work efficiency. Accordingly, efforts have been made to achieve both the worker's safety and the work efficiency.

With regard to the problem of decrease in work efficiency because of an operation stop that the robot experiences whenever the worker intervenes in the robot's operation, Patent Literature 1 discloses the following example as a conventional technique. Future positions of a worker and a robot are estimated on the basis of current positions and moving speeds of the worker and the robot, and a possibility of contact between the robot and the worker is judged on the basis of estimated values. In cases where future contact between the worker and the robot is judged to be unlikely, operation of the robot is not brought to a stop.

CITATION LIST

Patent Literature

Patent Literature 1: Japanese Patent Application Laid-open No. 2010-120139

SUMMARY

Technical Problem

However, according to the above conventional technique, with some work contents of the worker, an area that the worker does not use for work is overly set as an entry detection area. Because of this, the work efficiency problematically decreases.

In view of the above, an object of the present invention is to obtain a robot control device that reduces possibility of collision between a worker and a robot while maintaining high work efficiency when the worker and the robot work while sharing a work space.

Solution to Problem

To solve the above problem and achieve the object, the present invention provides a robot control device to control a robot that operates while sharing a work space with a worker who carries out one or more work processes each having a preset work content, the robot control device comprising: a robot control state measuring unit to measure a robot control state indicative of a position and a posture of the robot; a work area setting unit to store, for each of the work processes, a work area that is defined by work movement of the worker between a start and an end of each of the work processes and includes a space a body of the worker occupies and to set the work area corresponding to the work process currently carried out by the worker on a basis of a work process specifying signal specifying the work process currently carried out by the worker; and a robot command generator to generate a motion command for the robot on the basis of the work area and the robot control state, wherein the robot command generator varies the motion command for the robot on the basis of whether the robot is present in the work area.

Advantageous Effects of Invention

The present invention has the advantage of obtaining the robot control device that reduces possibility of collision between the worker and the robot while maintaining high work efficiency when the worker and the robot work while sharing the work space.

DESCRIPTION OF EMBODIMENTS

Robot control devices according to embodiments of the present invention are hereinafter described in detail with reference to the drawings. It is to be noted that these embodiments are not restrictive of the present invention.

First Embodiment

Figure 1:
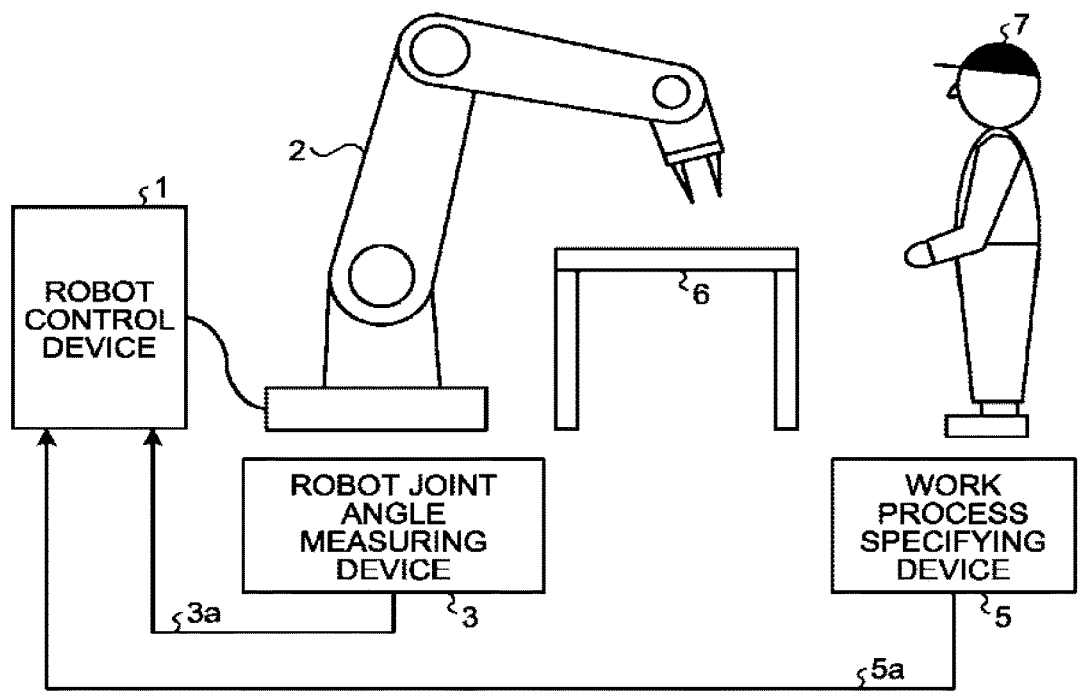
FIG. 1 schematically illustrates a robot system including a robot control device according to a first embodiment, and an example of a worksite to which the robot system is applied.

FIG. 1 schematically illustrates a robot system including a robot control device 1 according to the first embodiment of the present invention, and an example of a worksite to which the robot system is applied. The robot control device 1 illustrated in FIG. 1 is connected to a robot 2 and outputs a motion command to the robot 2 on the basis of a robot joint angle signal 3a from a robot joint angle measuring device 3 and a work process specifying signal 5a from a work process specifying device 5. In the worksite illustrated in FIG. 1, a workbench 6 is disposed, and a worker 7 is present. The robot 2 operates while sharing a work space with the worker 7.

Figure 2:
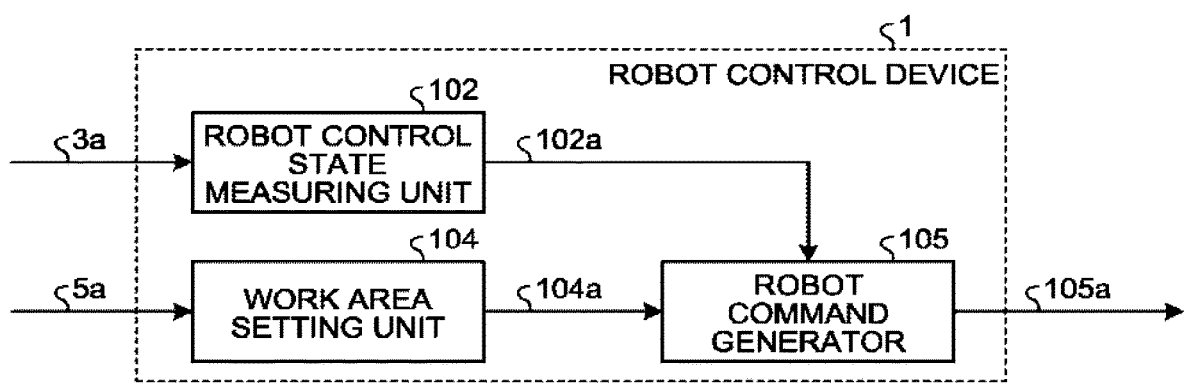
FIG. 2 is a block diagram illustrating an example configuration of the robot control device illustrated in FIG. 1.

FIG. 2 is a block diagram illustrating an example configuration of the robot control device 1 illustrated in FIG. 1. The robot control device 1 illustrated in FIG. 2 includes a robot control state measuring unit 102 that measures robot control state information 102a indicative of a robot position and a robot posture. The robot control device 1 also includes a work area setting unit 104 that stores, as a work area, an area that is defined by work movement of the worker 7 between a start and an end of each of work processes and includes a space a body of the worker 7 occupies. On the basis of the work process specifying signal 5a specifying the work process currently carried out by the worker 7, the work area setting unit 104 sets the work area corresponding to the work process currently carried out by the worker 7, thus outputting work area information 104a. The robot control device 1 also includes a robot command generator 105 that generates a motion command 105a for the robot 2 on the basis of the work area information 104a and the robot control state information 102a.

The robot control device 1 stores, for each of the work processes of the worker 7, work area data for the worker 7 in a storage unit that is not illustrated.

It is to be noted here that the work processes are a result of division of a series of work activities of the worker 7 based on work content. Given examples of a segmentation point between the work processes can be a point at which a position of the worker 7 changes, points at which a tool and a component that are used for work changes, a point at which a worker's body part to use in the work changes, and a discontinuous point of work movement of the worker 7. The work processes may be a result of division in accordance with a work schedule that is already used by the worker 7 at the worksite. Another alternative is that with required work time set for each of the work processes, the work processes may be separate from one another. The work process may have a setting of no work activity by the worker 7, and a work area corresponding to this work process is set as an empty set.

The robot control device 1 prestores, as the work area data, a spatial domain the body part of the worker 7 occupies in each of the divided work processes, each work process having a preset work content. The work area data may be pre-made on the basis of an assumable movement range of the worker 7 in each of the work processes through use of computer-aided design (CAD). Alternatively, the work area data may be made by premeasurement of movements of the worker 7 actually carrying out the work process.

The robot 2 includes a plurality of arms and also includes, at each of joints that are respective coupling points of the arms, a drive unit that controls a joint angle. In response to motion commands from the robot control device 1, the robot 2 can assume various positions and various postures. Given examples of the drive unit can be an electric motor that is exemplified by a servomotor or a stepping motor, and a cylinder using air pressure or oil pressure. However, the drive unit is not limited to these examples.

The robot system illustrated in FIG. 1 also includes the robot joint angle measuring device 3 that measures current-time joint angles of the robot 2. Encoders can be given as an example of the robot joint angle measuring device 3 and are each provided to the respective joints of the arms of the robot 2. Also an image sensor such as a camera can be given as an example of the robot joint angle measuring device 3 and may be used to measure the joint angles of the robot 2.

The work process specifying device 5 outputs the work process specifying signal 5a that specifies, from among work process data stored in the robot control device 1, the work process currently carried out by the worker 7. A digital switch can be given as an example of the work process specifying device 5 and is susceptible of switching by the worker 7. It is to be noted here that the digital switch may have an arrangement of as many buttons as there are divided work processes to specify. Another alternative is that with a work process execution order preset in the work process data, the digital switch may have an arrangement of buttons that allows control of the work process execution order. The work process specifying signal 5a may be transmitted using a wired or wireless system. In cases where the wireless system is used for the transmission, the robot control device 1 may include a radio receiver.

Among a work environment or the worker's part are a worker position, a worker posture, a position of the tool to use, a posture of the tool to use, a component position, and a component posture, all of which vary from one work process to another. In cases where, in addition to the work process data stored in the robot control device 1, at least one of the worker position, the worker posture, the position of the tool to use, the posture of the tool to use, the component position, and the component posture is prestored as information used to identify the one or more work processes and corresponds to the work process, the work process specifying device 5 is a sensor capable of obtaining corresponding work process determining data and only has to output a work process specifying signal 5a on the basis of a measurement result and the work process determining data. Given examples of the sensor that is capable of obtaining the work process determining data can be a Red Green Blue-Depth (RGB-D) sensor and a range sensor. However, the sensor capable of obtaining the work process determining data is not limited to these examples. For the purpose of compensating the above-mentioned sensor for an undetectable area and improving detection accuracy, a sensor such as a mat switch, a light curtain, or a laser sensor may be used concurrently.

The robot control state measuring unit 102 calculates respective angular velocities of the joints of the robot 2 on the basis of angle information on the joints of the robot 2 included in the robot joint angle signal 3a that is input from the robot joint angle measuring device 3. The angular velocity of each of the joints can be calculated by determination of a time differential value of the corresponding joint angle. Filtering the time differential value of the angular velocity of each of the joints enables noise removal. A low-pass filter can be given as an example of a filter that performs the filtering.

The robot control device 1 holds data on a housing of the robot 2, and the robot control state measuring unit 102 can calculate the robot control state information 102a indicative of the position and the posture of the robot 2 on the basis of the respective joint angles and the respective angular velocities of the joints of the robot 2.

The work area setting unit 104 outputs, from among the work area data stored in the robot control device 1, the work area information 104a corresponding to the current work process of the worker 7 specified by the work process specifying signal 5a.

Figure 3:
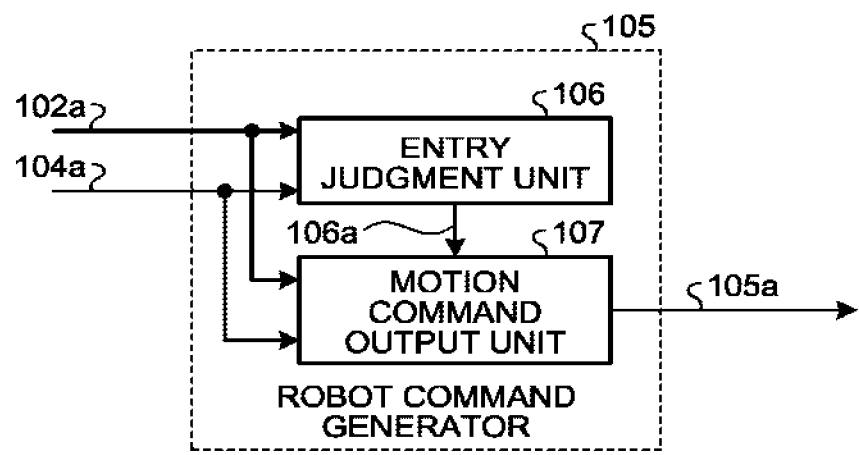
FIG. 3 is a block diagram illustrating an example configuration of a robot command generator illustrated in FIG. 2.

FIG. 3 is a block diagram illustrating an example configuration of the robot command generator 105 illustrated in FIG. 2. The robot command generator 105 illustrated in FIG. 3 includes an entry judgment unit 106 that outputs an entry judgment signal 106a indicative of whether the robot 2 enters the work area indicated by the work area information 104a. The robot command generator 105 also includes a motion command output unit 107. The motion command output unit 107 outputs, to the robot 2, a motion command 105a in a non-entry control mode that is a first control mode when it is determined on the basis of the entry judgment signal 106a that the robot 2 does not enter the work area indicated by the work area information 104a. The motion command output unit 107 outputs, to the robot 2, a motion command 105a in an entry control mode that is a second control mode when it is determined on the basis of the entry judgment signal 106a that the robot 2 enters the work area indicated by the work area information 104a.

On the basis of the robot control state information 102a and the work area information 104a, the entry judgment unit 106 outputs the entry judgment signal 106a indicative of whether the robot 2 enters the work area indicated by the work area information 104a. In making an entry judgment, a part of a housing of the robot 2 exemplified by a robot hand is set as a judgment point, and a judgment only has to be made whether this judgment point is present inside the work area indicated by the work area information 104a.

In the non-entry control mode, that is to say, in the first control mode, the motion command output unit 107 outputs the motion command 105a in accordance with a robot motion trajectory. The robot motion trajectory is a history of command values for respective joint angles of the arms that form the robot 2 and is taught in advance on the basis of work contents of the robot 2. When the robot 2 enters the work area indicated by the work area information 104a while operating in accordance with the robot motion trajectory, the entry judgment unit 106 varies the entry judgment signal 106a, thereby shifting to the entry control mode that is the second control mode. To prevent the robot 2 from entering the work area indicated by the work area information 104a, the operation of the robot 2 may be controlled so that the robot 2 stops before entering the work area indicated by the work area information 104a.

In the entry control mode, that is to say, in the second control mode, the motion command output unit 107 outputs a stop command to the robot 2.

Figure 4A:
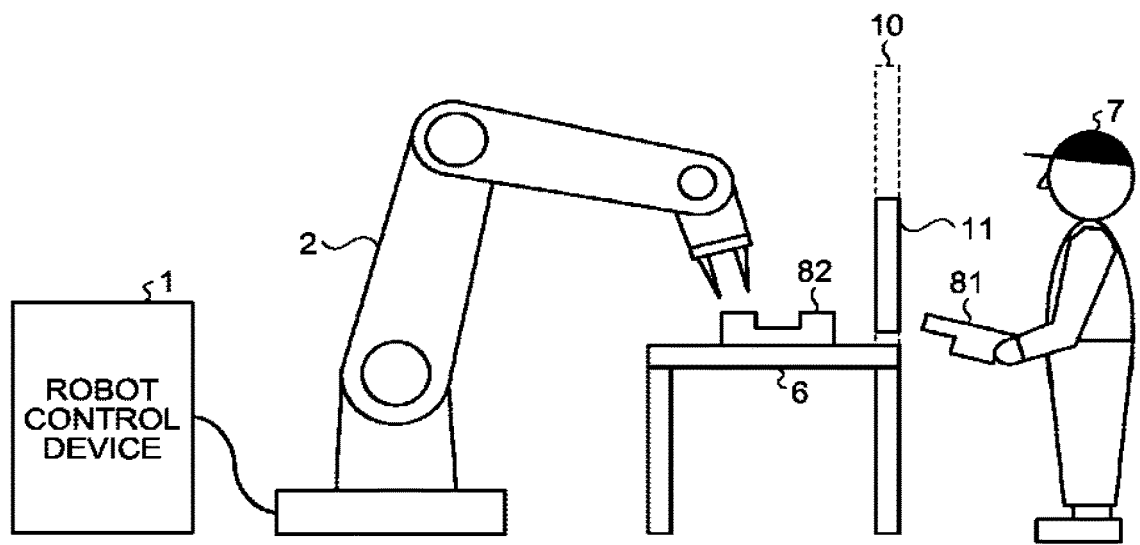
FIG. 4 schematically illustrates a worksite where a robot and a worker work while sharing a work space in the first embodiment.
Figure 4B:
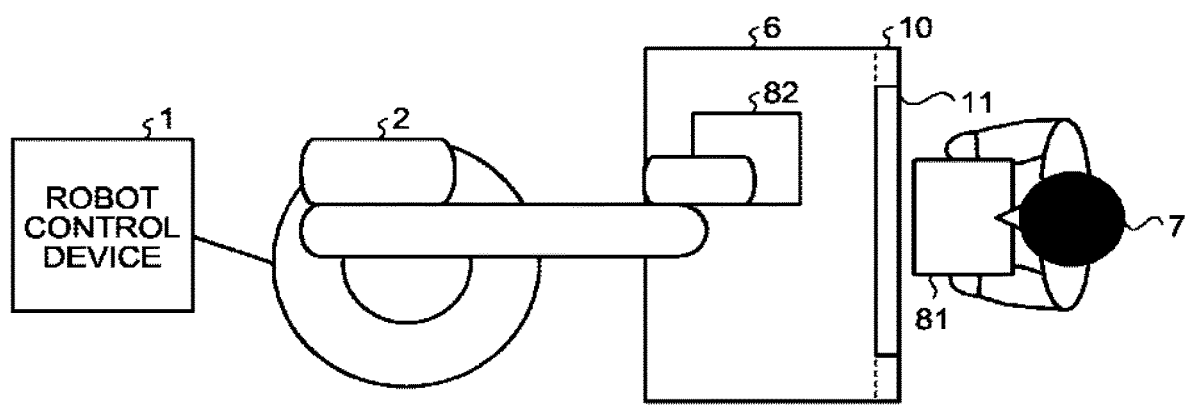

FIG. 4 schematically illustrates a worksite where the robot 2 and the worker 7 work while sharing a work space in the present embodiment. FIG. 4A is a side view of the worksite, while FIG. 4B is a bird's-eye view of the worksite. In FIG. 4, space above a workbench 6 is shared work space where the robot 2 and the worker 7 work. The robot 2 operates in accordance with the preset robot motion trajectory when the worker 7 momentarily enters a movable range of the robot 2.

In the general worksite, the robot 2 and the worker 7 are separated by a safety fence 10 as illustrated in FIG. 4. When entry of the worker 7 is detected on the basis of a signal of an entry detection device 11 such as an interlock or a light curtain, the work space above the workbench 6 is set for the worker 7, and the operation of the robot 2 is brought to a stop. When the entry of the worker 7 is no longer detected, the robot 2 resumes its operation to share the work space with the worker 7. In such a worksite, however, the robot 2 overly reacts to the entry of the worker 7 into the shared work space and stops, so that work efficiency problematically decreases. For example, when the worker 7 brings a work object 81 next to a work object 82 on the workbench 6 while the robot 2 works on the work object 82 in FIG. 4, the entry detection device 11 detects the entry of the worker 7, so that the robot 2 is brought to an unnecessary stop in the middle of its work even though the worker 7 and the robot 2 can work independently of each other. Consequently, the work efficiency decreases.

In the above-described present embodiment, however, the work area of the worker 7 is set correspondingly to the work process of the worker 7, so that a motion-restricted range can be narrowed down for the robot 2 on the basis of that work area. As such, frequency of stops the robot 2 experiences can be suppressed, and consequently, efficiency of cooperative work between the worker 7 and the robot 2 can improve. In the present embodiment, the work area only has to be set as described above, and the safety fence 10 and the entry detection device 11 may be provided.

Second Embodiment

Figure 5:
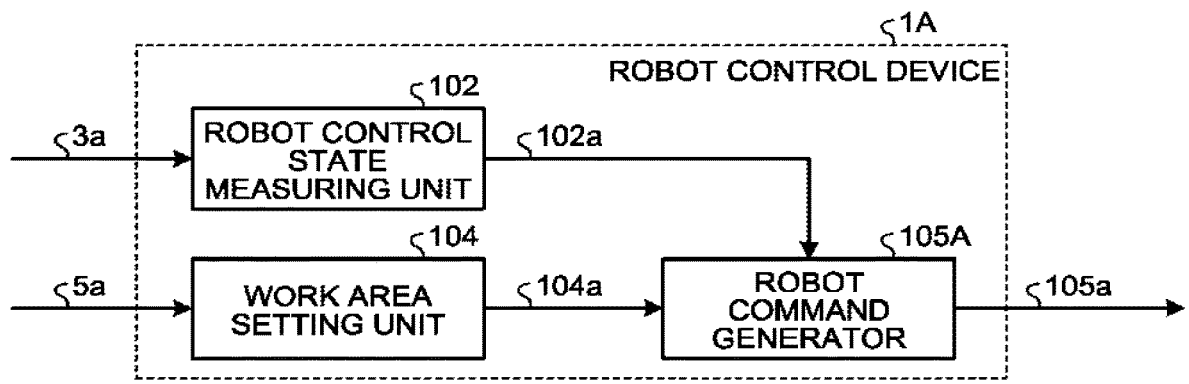
FIG. 5 is a block diagram illustrating an example configuration of a robot control device according to a second embodiment.

In the present embodiment, a description is provided of a robot command generator that operates in a robot control device to evacuate the robot 2 from a work area. FIG. 5 is a block diagram illustrating an example configuration of the robot control device 1A according to the present embodiment. The robot control device 1A illustrated in FIG. 5 includes the robot command generator 105A in place of the robot command generator 105 illustrated in FIG. 2.

Figure 6:
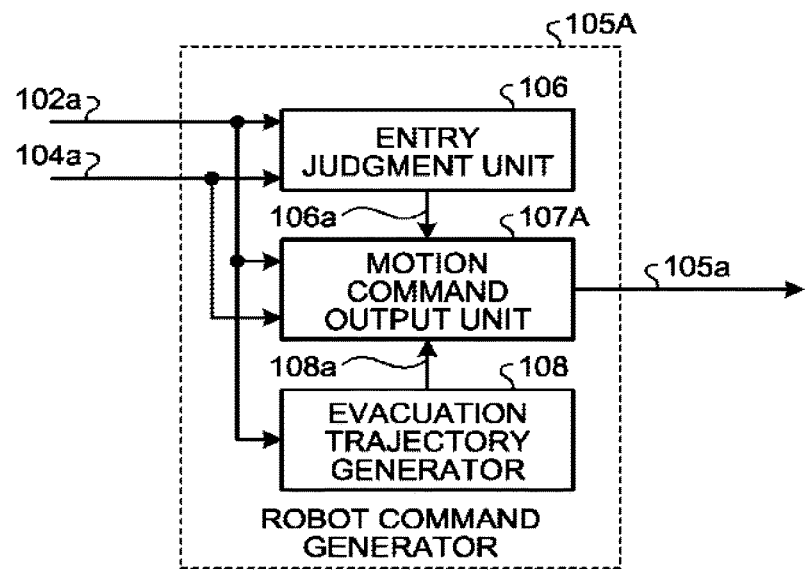
FIG. 6 is a block diagram illustrating an example configuration of a robot command generator illustrated in FIG. 5.

FIG. 6 is a block diagram illustrating an example configuration of the robot command generator 105A illustrated in FIG. 5. The robot command generator 105A illustrated in FIG. 6 includes an evacuation trajectory generator 108 and, in place of the motion command output unit 107 illustrated in FIG. 3, a motion command output unit 107A.

On the basis of the robot control state information 102a, the evacuation trajectory generator 108 generates evacuation trajectory information 108a that extends from a current control state of the robot 2 to a control state at an evacuation point that is preset for the robot 2. The evacuation point mentioned here is a temporary spatial point to which the robot 2 moves independently of its preset work so as not to obstruct work of the worker 7. The evacuation point is at least one spatial point that is set in consideration of a work content of the worker 7 and a preset work area.

The evacuation trajectory information 108a leading to the evacuation point may be made in relation to time by application of the current robot control state information 102a and respective angular variations of the arm joints of the robot 2 at the evacuation point to linear interpolation.

The motion command output unit 107A outputs a motion command 105a to the robot 2 on the basis of the robot control state information 102a, the work area information 104a, the entry judgment signal 106a, and the evacuation trajectory information 108a.

When it is determined on the basis of the entry judgment signal 106a that the robot 2 does not enter the work area indicated by the work area information 104a, the motion command output unit 107A outputs, to the robot 2, a motion command 105a in a non-entry control mode that is a first control mode. When it is determined on the basis of the entry judgment signal 106a that the robot 2 enters the work area indicated by the work area information 104a, the motion command output unit 107A outputs, to the robot 2, a motion command 105a in an entry control mode that is a second control mode.

The non-entry control mode or the first control mode of the motion command output unit 107A is similar to the non-entry control mode or the first control mode of the first embodiment's motion command output unit 107 and thus is not described.

In the entry control mode, that is to say, in the second control mode, the motion command output unit 107A outputs, to the robot 2, the motion command 105a in accordance with the evacuation trajectory information 108a. In cases where a plurality of evacuation points is set, one is selected from among a plurality of pieces of evacuation trajectory information 108a. In one example of an evacuation trajectory selecting method, the evacuation point to use may be specified in advance for each of the work processes. Another alternative is that the evacuation point may be selected in association with the current robot control state information 102a and the work area information 104a to enable the robot 2 to be withdrawn, in accordance with the evacuation trajectory information 108a, out of the work area indicated by the work area information 104a for the shortest distance or in the shortest amount of time. Yet another alternative is that the evacuation point may be selected so that the housing of the robot 2 in the work area indicated by the work area information 104a becomes volumetrically smallest before the robot 2 is withdrawn out of that work area. Still yet another alternative is that the evacuation point may be selected so that before the robot 2 withdraws out of the work area indicated by the work area information 104a, a specified part of the robot 2 in that work area, such as exemplified by the robot hand, becomes volumetrically smallest.

When a result of evaluation of operation of the robot 2 in a direction that effects progress in work or reverses the work in accordance with the preset robot motion trajectory in selection of the evacuation point on the basis of the above-mentioned method of selecting the evacuation trajectory information 108a demonstrates that withdrawal of the robot from the work area indicated by the work area information 104a is more appropriate in accordance with the robot motion trajectory than in accordance with any of pieces of the evacuation trajectory information 108a, the motion command 105a may be output to the robot 2 in accordance with that robot motion trajectory.

The motion command output unit 107A may perform such setting that in cases where during movement of the robot 2 to the evacuation point in accordance with the evacuation trajectory information 108a, it is determined that the robot 2 is withdrawn from the work area indicated by the work area information 104a, the robot 2 is stopped before reaching the evacuation point.

FIG. 7 is a bird's-eye view schematically illustrating a worksite where the robot 2 and the worker 7 work while sharing a work space in the present embodiment. The worksite illustrated in FIG. 7 is similar to the worksite illustrated in FIG. 4, so that identical constituent elements are denoted by the same reference signs, and descriptions of those constituent elements are omitted.

Figure 7A:
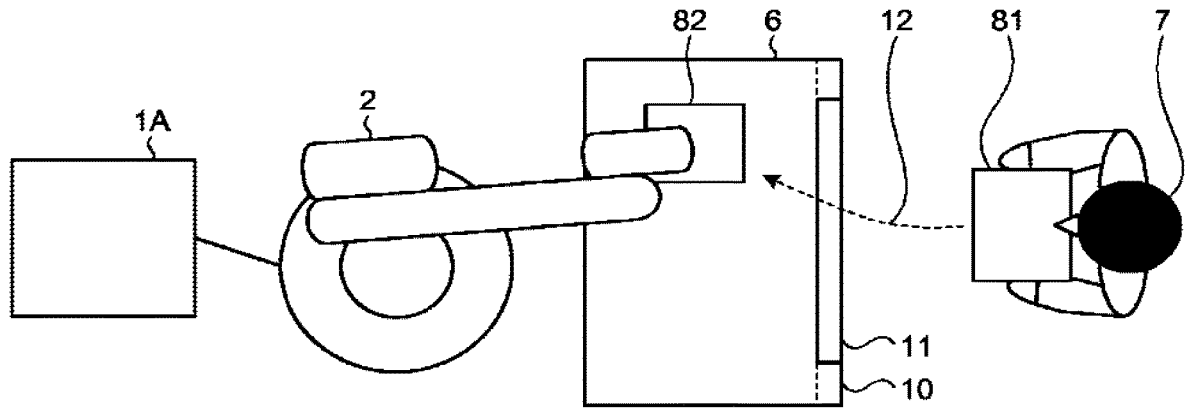
FIG. 7 is a bird's-eye view schematically illustrating a worksite where a robot and a worker work while sharing a work space in the second embodiment.
Figure 7B:
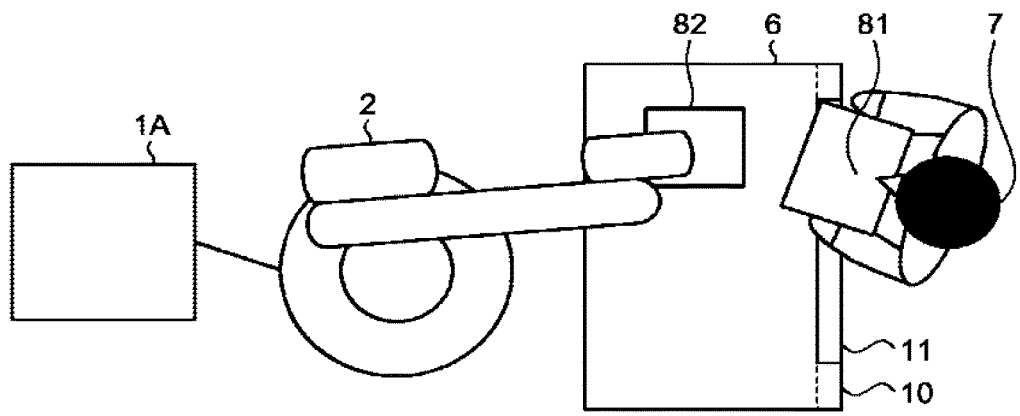
Figure 7C:
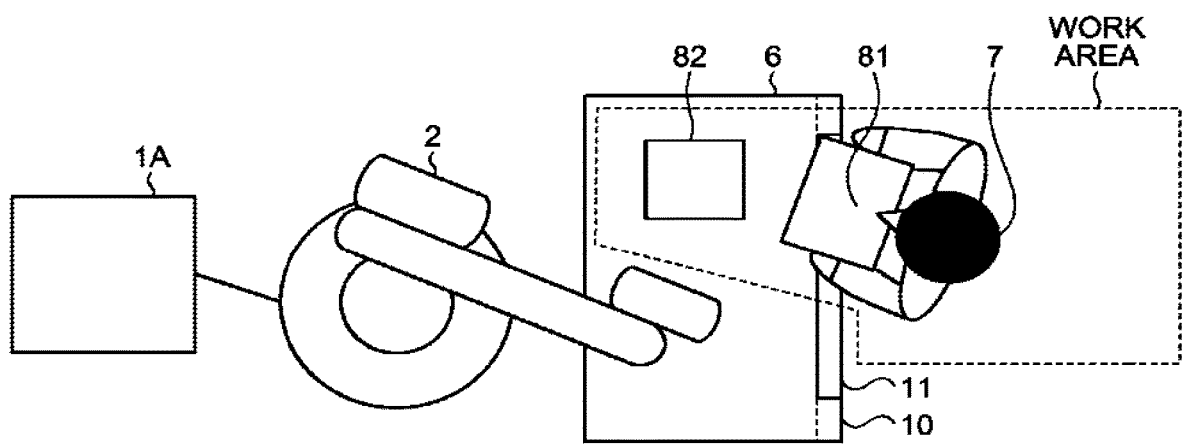

In FIGS. 7A to 7C, the worker 7 enters the shared work space in order to assemble the work object 81 to the work object 82. In FIG. 7A, the worker 7 carrying the work object 81 comes close to the work object 82 placed on the workbench 6, while the robot 2 works on the work object 82. In FIG. 7A, an estimated route 12 corresponding to a current work process of the worker 7 is indicated by an arrowed dashed line.

In FIGS. 7B and 7C, the worker 7 comes even closer to the work object 82 compared with FIG. 7A. In FIG. 7B, there is a possibility that a work range that allows the worker 7 to work on the work object 82 cannot be secured because detection of the entry of the worker 7 by the entry detection device 11 brings the robot 2 to an operation stop in close proximity to the work object 82. Then, the worker 7 cannot assemble the work object 81 to the work object 82 because the robot 2 is an obstacle. The worker 7 needs to be on standby to prioritize the operation of the robot 2 or needs to bring automatic operation of the robot 2 to a forced stop and to move the robot 2, through jog operation, to a position where the robot 2 is no longer an obstacle to the assembly work. In either of the cases, work efficiency problematically decreases.

In the present embodiment, however, the work area is set when the worker 7 comes close to the work object 82, and the motion command 105a is output to effect evacuation of the robot 2 from that work area. As such, the robot 2 can be prevented from getting too close to that work area and obstructing the assembly work. Consequently, the worker 7 does not need to wait or move the robot 2 through jog operation, so that improved efficiency of cooperative work between the worker 7 and the robot 2 can be achieved.

Third Embodiment

In the present embodiment, a description is provided of operation of the robot 2 that is evacuated in advance from a work area subsequent to a current work process of the worker 7.

Figure 8:
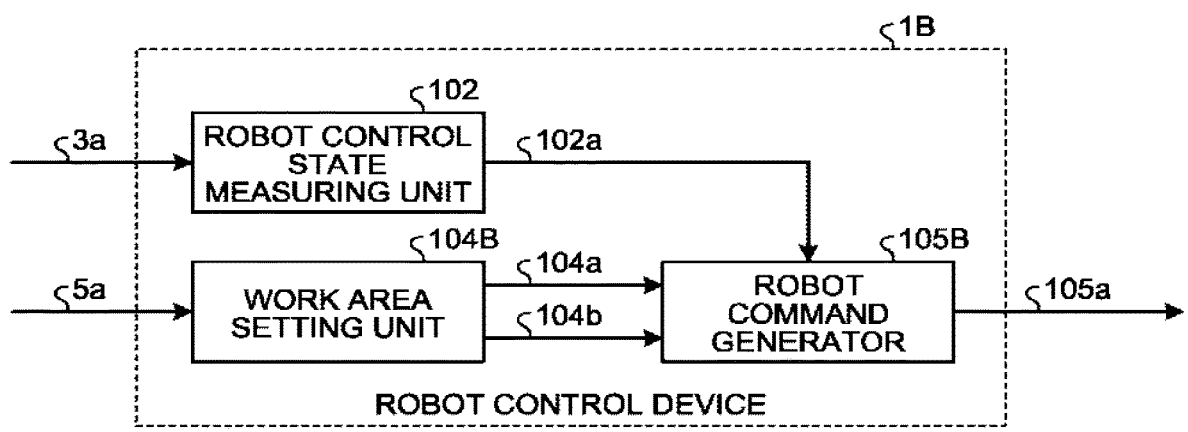
FIG. 8 is a block diagram illustrating an example configuration of a robot control device according to a third embodiment.

FIG. 8 is a block diagram illustrating an example configuration of a robot control device 1B according to the present embodiment. In FIG. 8, constituent elements that are similar to the constituent elements illustrated in FIG. 2 are denoted by the same reference signs, and descriptions of those constituent elements are omitted. The robot control device 1B illustrated in FIG. 8 includes a work area setting unit 104B in place of the work area setting unit 104 illustrated in FIG. 2 and includes a robot command generator 105B in place of the robot command generator 105.

The work area setting unit 104B stores, in addition to a work area for the current work process, a subsequent work process, such that the work area setting unit 104B sets, for output, the work area corresponding to the subsequent work process in a subsequent work area information 104b in addition to setting of the work area corresponding to the current work process of the worker 7 in the work area information 104a. On the basis of the work area information 104a, the subsequent work area information 104b, and the robot control state information 102a, the robot command generator 105B varies a way of generating a motion command 105a for the robot 2 in accordance with when the robot 2 enters the work area indicated by the work area information 104a and not the work area indicated by the subsequent work area information 104b, when the robot 2 enters the work area indicated by the subsequent work area information 104b and not the work area indicated by the work area information 104a, and when the robot 2 enters neither of the work areas that are indicated by the work area information 104a and the subsequent work area information 104b.

Given examples of the way of generating the motion command 105a can be such that a stop command in the first embodiment's entry control mode or second control mode is output to the robot 2 when the robot 2 enters the work area indicated by the work area information 104a and not the work area indicated by the subsequent work area information 104b, such that an evacuation command in the second embodiment's entry control mode or second control mode is output to the robot 2 when the robot 2 enters the work area indicated by the subsequent work area information 104b and not the work area indicated by the work area information 104a, and such that a motion command in the first embodiment's non-entry control mode or first control mode is output in cases where the robot 2 enters neither of the work areas that are indicated by the work area information 104a and the subsequent work area information 104b.

FIG. 9 is a bird's-eye view schematically illustrating a worksite where the robot 2 and the worker 7 work while sharing a work space in the present embodiment. The worksite illustrated in FIG. 9 is similar to the worksite illustrated in FIG. 4, so that identical constituent elements are denoted by the same reference signs, and descriptions of those constituent elements are omitted. In FIG. 9, the work object 82 and a work object 83 are placed on the workbench 6, a workbench 61 is placed opposite to one side of the rectangular workbench 6, and the work object 81 and a work object 84 are placed on the workbench 61. It is to be noted that the worksite illustrated in FIG. 9 is given as an example and thus is not restrictive of worksite layout and work contents of the worker 7.

Figure 9A:
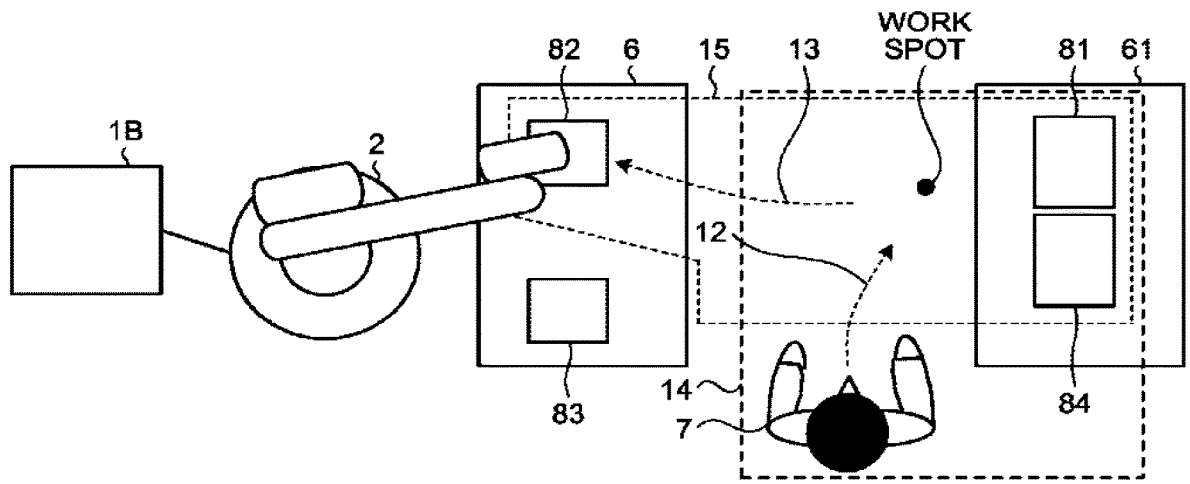
FIG. 9 is a bird's-eye view schematically illustrating a worksite where a robot and a worker work while sharing a work space in the third embodiment.
Figure 9B:
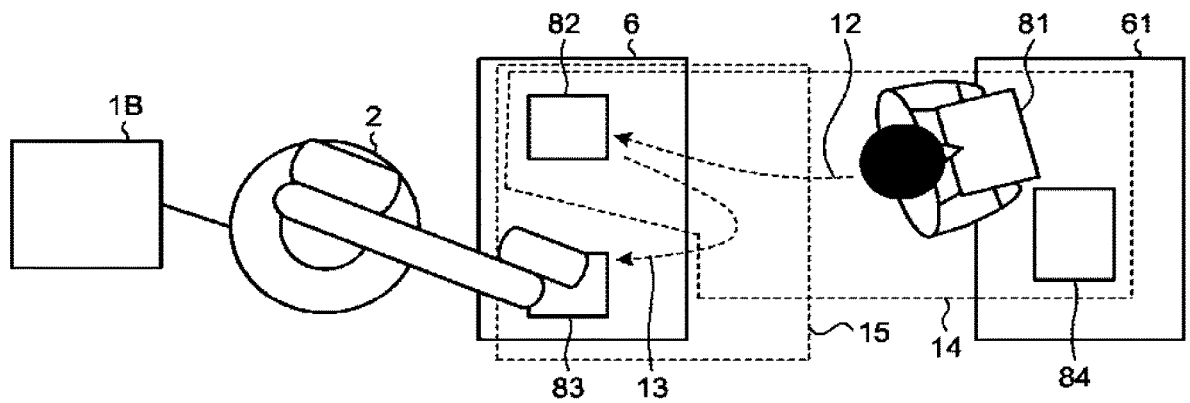
Figure 9C:
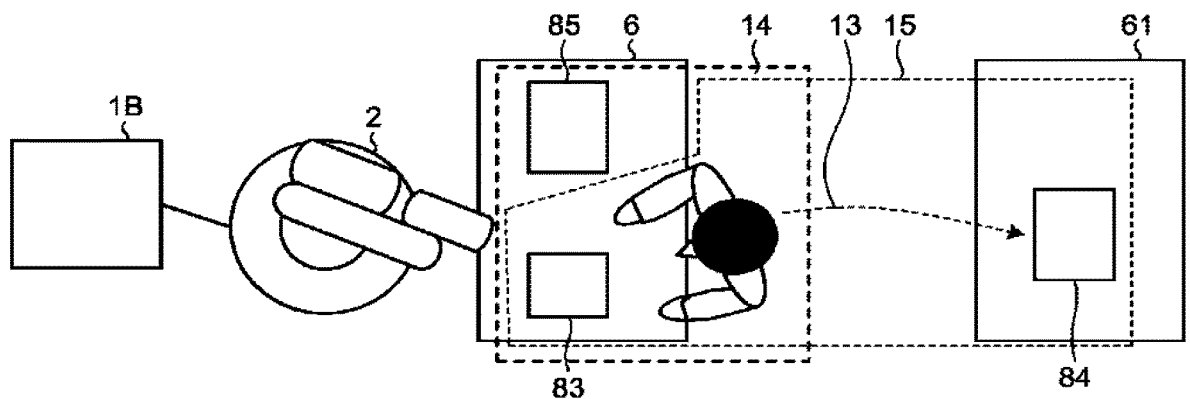

In FIGS. 9A to 9C, work by the worker 7 progresses according to work processes, from FIGS. 9A to 9B and then to FIG. 9C. FIGS. 9A to 9C illustrate corresponding estimated routes 12 corresponding to current work processes, corresponding current work areas 14 corresponding to the current work processes, corresponding estimated routes 13 corresponding to subsequent work processes, and corresponding subsequent work areas 15 corresponding to the subsequent work processes. Each of the current work areas 14 and each of the subsequent work areas 15 are areas set by a user to each prohibit entry of the robot 2 while the worker 7 does corresponding work. In consideration of variations in work movement of the worker 7 who repeats intended work, each of the current work area 14 and the subsequent work area 15 is preferably set to be larger than an area that is occupied by the body of the worker 7 while the worker 7 does the intended work. The work processes change in a process that leads from FIGS. 9A to 9C, so that the subsequent work area 15 in FIG. 9A becomes the current work area 14 in FIG. 9B in which the subsequent work area 15 is set as a new area. The same goes for the subsequent work area 15 and the current work area 14 in FIGS. 9B and 9C.

In FIGS. 9A to 9C, the work processes are set as follows. The robot 2 works on the work object 82 and the work object 83 first. Next, the worker 7 assembles the work object 81 to the work object 82 that has been worked on by the robot 2 and works on a resulting work object 85. Concurrently with or subsequently to this assembly work by the worker 7, the robot 2 works on the work object 83. Next, the worker 7 carries the work object 83 that has been worked on by the robot 2 for assembly to the work object 84. To this end, the worker 7 firstly carries out the work process of moving from a position illustrated in FIG. 9A to a work spot that adjoins the workbench 61 between the workbench 6 and the workbench 61 and getting the work object 81, so that the current work area 14 corresponding to this work process is set to include at least the current position of the worker 7 and the work object 81. In FIG. 9A, the work process subsequent to the work process in which the work object 81 is fetched is such that the fetched work object 81 is brought to the workbench 6 and is assembled to the work object 82. As such, in FIG. 9A, the subsequent work area 15 corresponding to the subsequent work process is set to include the work object 81 and the work object 82. Then in FIG. 9A, although the robot 2 is not in the current work area 14, the robot 2 is in the subsequent work area 15, so that the evacuation command in the second embodiment's entry control mode or second control mode is output to the robot 2 to effect evacuation of the robot 2 from the subsequent work area 15 without effecting entry of the robot 2 into the current work area 14.

According to the present embodiment, the robot 2 can be evacuated in advance from the subsequent work area that cannot be considered on the basis of the moving route estimated only from the movement of the worker 7 in the current work process, that is to say, from the work area the worker 7 occupies in future movement corresponding to the work process; thus, the robot 2 can be prevented from entering the work area of the workers 7 indicated by the subsequent work area information 104b. In cases where a moving route of the worker 7 is estimated only from a current movement flow of the worker 7, such estimation of the moving route is difficult when the worker 7 moves in accordance with the work process in a manner that cannot be estimated from the current movement flow. The present embodiment makes possible that estimation even when the worker 7 moves in the manner that cannot be estimated from the current movement flow, such as when the worker 7 suddenly changes a moving direction in accordance with the work process.

Fourth Embodiment

Figure 10:
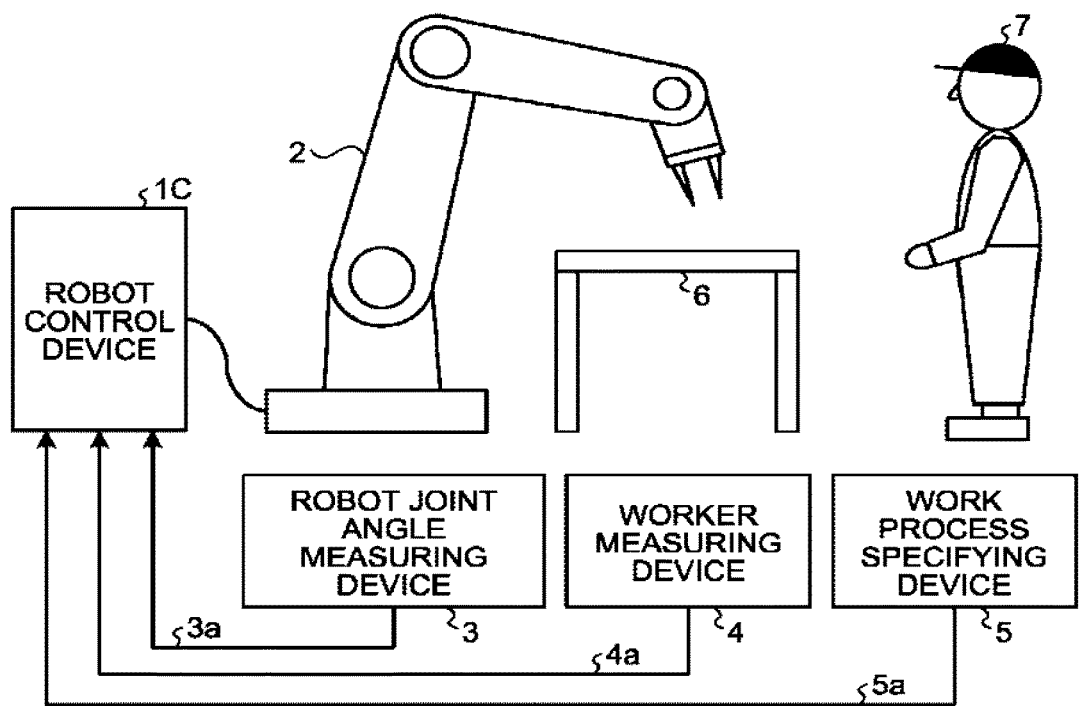
FIG. 10 schematically illustrates a robot system including a robot control device according to a fourth embodiment, and an example of a worksite to which the robot system is applied.

FIG. 10 schematically illustrates a robot system including a robot control device 1C according to the present embodiment, and an example of a worksite to which the robot system is applied. Compared with the robot system illustrated in FIG. 1, the robot system illustrated in FIG. 10 includes a worker measuring device 4 as an addition. In FIG. 10, constituent elements that are similar to the constituent elements illustrated in FIG. 1 are denoted by the same reference signs, and descriptions of those constituent elements are omitted.

Figure 11:
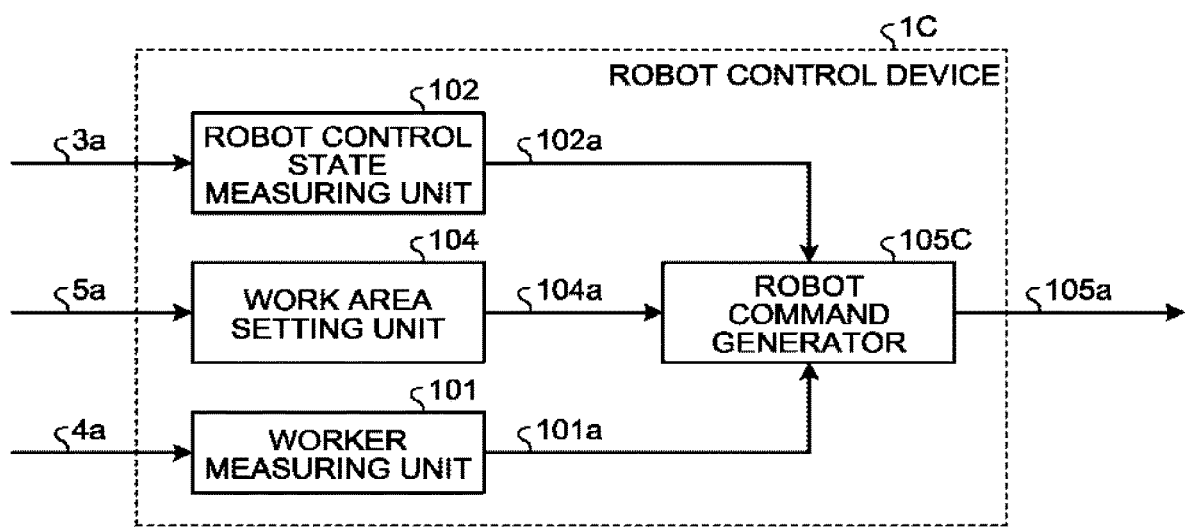
FIG. 11 is a block diagram illustrating an example configuration of the robot control device illustrated in FIG. 10.

FIG. 11 is a block diagram illustrating an example configuration of the robot control device 1C illustrated in FIG. 10. Compared with the robot control device 1 illustrated in FIG. 2, the robot control device 1C illustrated in FIG. 11 includes a worker measuring unit 101 as an addition. The worker measuring unit 101 measures a worker state indicative of a position and a posture of the worker 7 to output a worker state information 101a. On the basis of the worker state information 101a, the work area information 104a, and the robot control state information 102a, a robot command generator 105C generates a motion command 105a for the robot 2. In FIG. 11, constituent elements that are similar to the constituent elements illustrated in FIG. 2 are denoted by the same reference signs, and descriptions of those constituent elements are omitted.

The worker measuring device 4 is a sensor device that measures one or more body parts of the worker 7 as physical measurement points to output position information 4a. The position information 4a is output to the robot control device 1C at fixed intervals. Given examples of the worker measuring device 4 can be an RGB-D sensor and a range sensor as with the first embodiment's sensor capable of obtaining the work process determining data. However, the worker measuring device 4 is not limited to these examples.

Figure 12:
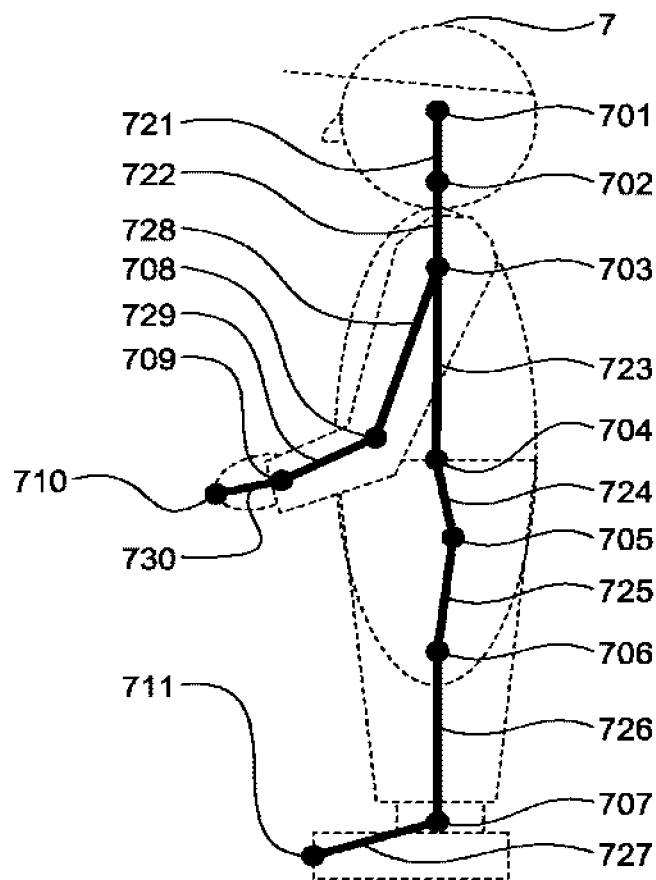
FIG. 12 illustrates examples of physical measurement points to set for a worker in the fourth embodiment.

In the present embodiment, the physical measurement points of the worker 7 are set to enable detection of the posture of the worker 7. FIG. 12 illustrates examples of the physical measurement points set for the worker 7 in the present embodiment. As the physical measurement points of the worker 7, as illustrated in FIG. 12, a head 701, a neck 702, a shoulder 703, a spine 704, a hip 705, a knee 706, an ankle 707, an elbow 708, a wrist 709, a finger 710, and a toe 711 are set. Moreover, a bony part 721 between the head 701 and the neck 702, a bony part 722 between the neck 702 and the shoulder 703, a bony part 723 between the shoulder 703 and the spine 704, a bony part 724 between the spine 704 and the hip 705, a bony part 725 between the hip 705 and the knee 706, a bony part 726 between the knee 706 and the ankle 707, a bony part 727 between the ankle 707 and the toe 711, a bony part 728 between the shoulder 703 and the elbow 708, a bony part 729 between the elbow 708 and the wrist 709, and a bony part 730 between the wrist 709 and the finger 710 are set.

With the body of the worker 7 expressed by a human skeletal model as illustrated in FIG. 12, the posture of the worker 7 can be detected on the basis of the position information 4a that includes the physical measurement points measured by the worker measuring device 4.

It is to be noted, however, that the physical measurement points are not limited to these. In accordance with a work content of the worker 7, some of the physical measurement points illustrated in FIG. 12 may be selected, and physical measurement points other than the physical measurement points illustrated in FIG. 12 may be added.

In addition, a signal from another sensor that is installed in a general worksite, namely, an existing sensor such as a mat switch, a light curtain, or a laser sensor may be used concurrently for the purpose of improving accuracy of the worker position information 4a on the worker 7 and compensating the worker measuring device 4 for an undetectable positional area of the worker 7.

Figure 13:
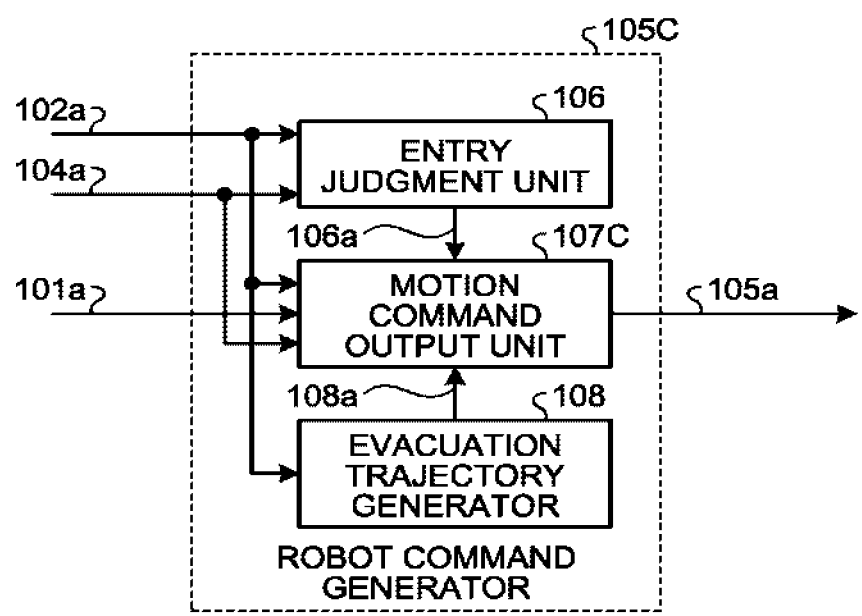
FIG. 13 is a block diagram illustrating an example configuration of a robot command generator illustrated in FIG. 11.

FIG. 13 is a block diagram illustrating an example configuration of the robot command generator 105C illustrated in FIG. 11. The robot command generator 105C illustrated in FIG. 13 includes a motion command output unit 107C in place of the motion command output unit 107A of the FIG. 6 robot command generator 105A. The motion command output unit 107C outputs a motion command 105a to the robot 2 on the basis of the worker state information 101a, the robot control state information 102a, the work area information 104a, the entry judgment signal 106a, and the evacuation trajectory information 108a. In FIG. 13, constituent elements that are similar to the constituent elements illustrated in FIG. 6 are denoted by the same reference signs, and descriptions of those constituent elements are omitted. It is to be noted that the evacuation trajectory generator 108 may not be provided in the present embodiment.

When it is determined on the basis of the entry judgment signal 106a that the robot 2 does not enter the work area indicated by the work area information 104a, the motion command output unit 107C outputs, to the robot 2, a motion command 105a in a non-entry control mode that is a first control mode. When it is determined on the basis of the entry judgment signal 106a that the robot 2 enters the work area indicated by the work area information 104a, the motion command output unit 107C outputs, to the robot 2, a motion command 105a in an entry control mode that is a second control mode.

The non-entry control mode or the first control mode of the motion command output unit 107C here is similar to the non-entry control mode of the first embodiment's motion command output unit 107 and thus is not described. In the entry control mode or the second control mode of the motion command output unit 107C, compared with the second mode of the motion command output unit 107A, a limiting value is set on operating speed of the robot 2 on the basis of the worker state information 101a and the robot control state information 102a. For example, as the worker 7 and the robot 2 get closer to each other from a current time within the shortest distance between the worker 7 and the robot 2, the limiting value may be set lower on the operating speed of the robot 2. Alternatively, the limiting value may be set lower on the operating speed of the robot 2 as relative speeds of the worker 7 and the robot 2 get higher within the shortest distance.

According to the present embodiment, even when the robot 2 enters the set worker's work area indicated by the work area information 104a, the robot control device 1C can evacuate the robot 2 from the work area indicated by the work area information 104a while avoiding a collision between the robot 2 and the worker 7 on the basis of current relative positions of the robot 2 and the worker 7.

Fifth Embodiment

Figure 14:
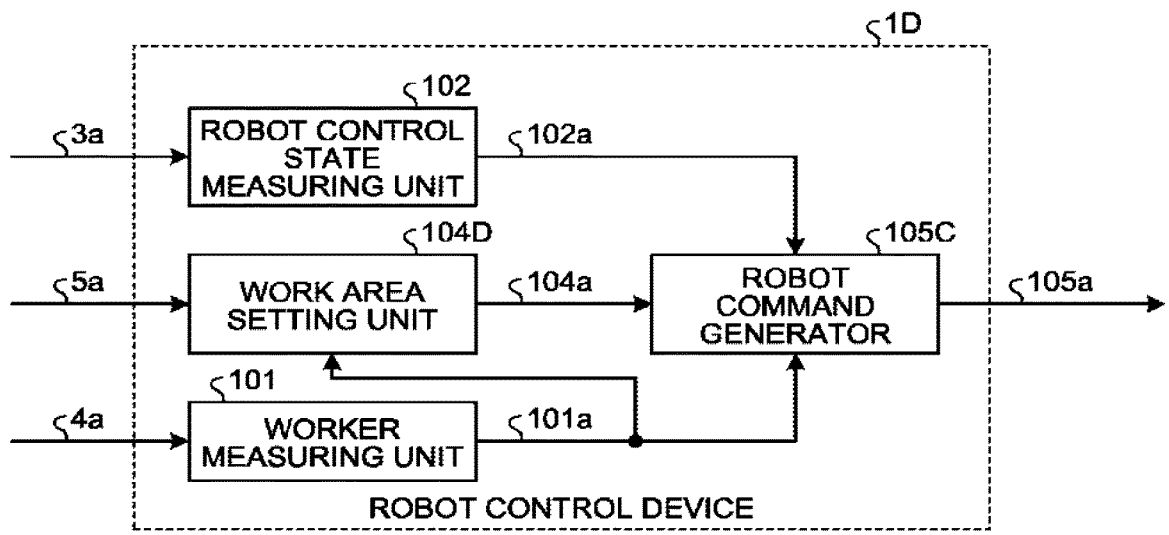
FIG. 14 is a block diagram illustrating an example configuration of a robot control device according to a fifth embodiment.

In the present embodiment, a description is provided of input of the worker state information 101a to a work area setting unit. FIG. 14 is a block diagram illustrating an example configuration of a robot control device 1D according to the present embodiment. In FIG. 14, constituent elements that are similar to the constituent elements illustrated in FIG. 11 are denoted by the same reference signs, and descriptions of those constituent elements are omitted. The robot control device 1D illustrated in FIG. 14 includes the work area setting unit 104D in place of the work area setting unit 104 of the robot control device 1C illustrated in FIG. 11.

Figure 15:
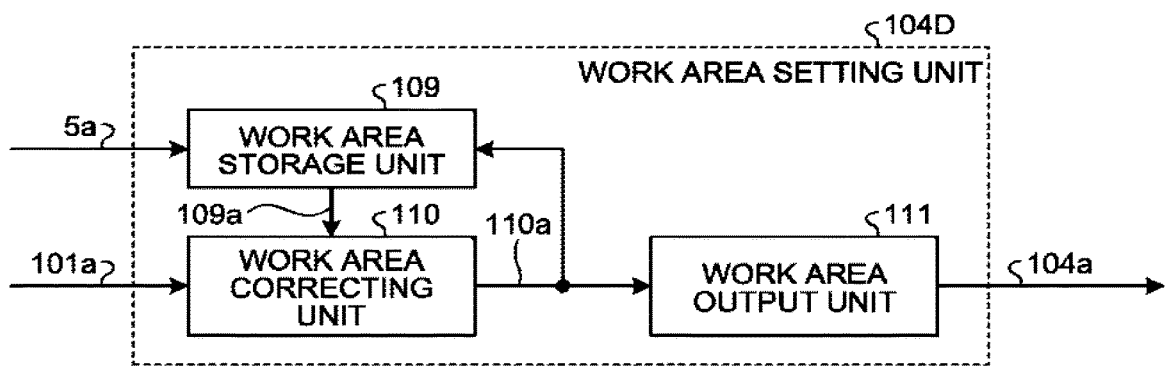
FIG. 15 is a block diagram illustrating an example configuration of a work area setting unit illustrated in FIG. 14.

FIG. 15 is a block diagram illustrating an example configuration of the work area setting unit 104D illustrated in FIG. 14. The work area setting unit 104D illustrated in FIG. 15 includes a work area storage unit 109, a work area correcting unit 110, and a work area output unit 111. To correct the work area data prestored in the work area storage unit 109, the work area storage unit 109 stores correction work area data obtained by duplicating the prestored work area data. The work area storage unit 109 then outputs, from among the stored correction work area data, correction work area information 109a corresponding to the work process of the worker 7 specified by the work process specifying signal 5a. On the basis of a statistical comparison between the correction work area information 109a and the worker state information 101a, the work area correcting unit 110 corrects the correction work area information 109a to effect a small difference between an adjusted work area and an actual area used for work movement of the worker 7 and thus outputs corrected work area information 110a. The work area output unit 111 outputs the corrected work area information 110a as work area information 104a. The work area storage unit 109 corrects the corresponding correction work area data on the basis of the corrected work area information 110a.

According to the present embodiment, by using the worker state information 101a measured on the basis of the actual work movement of the worker 7, the robot control device 1D corrects the preset worker's work area indicated by the work area information 104a. As such, the work area indicated by the work area information 104a can be reset in accordance with a trajectory of or a range of work movement that varies among workers.

Sixth Embodiment

Figure 16:
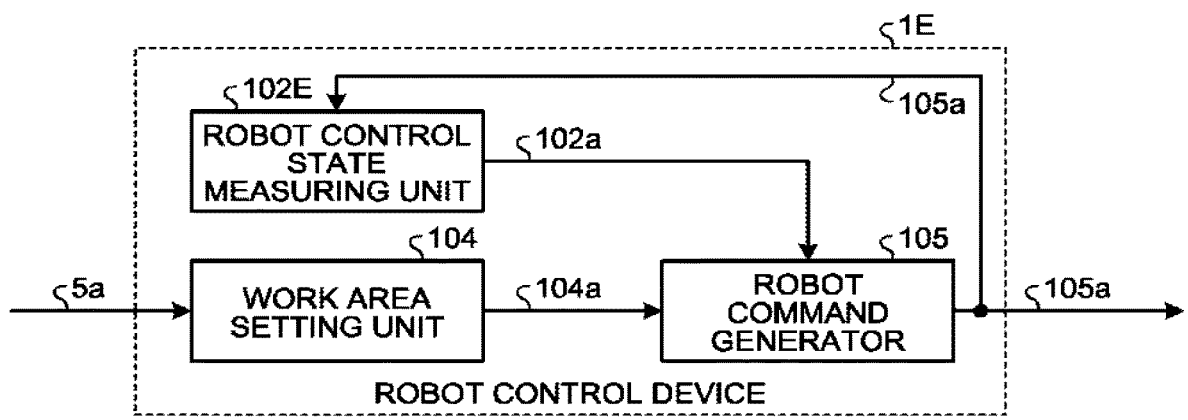
FIG. 16 is a block diagram illustrating an example configuration of a robot control device according to a sixth embodiment.

In the present embodiment, a description is provided of input of the motion command 105a to a robot control state measuring unit. FIG. 16 is a block diagram illustrating an example configuration of a robot control device 1E according to the present embodiment. The robot control device 1E illustrated in FIG. 16 includes the robot control state measuring unit 102E in place of the robot control state measuring unit 102 of the robot control device 1 illustrated in FIG. 2. In place of the robot joint angle signal 3a, the motion command 105a is input to the robot control state measuring unit 102E.

The present embodiment can remove the robot joint angle measuring device 3 from a robot system, thus enabling reduction in size and cost reduction.

The configurations illustrated in the above embodiments are illustrative of the contents of the present invention and can be combined with other publicly known techniques. These configurations can be partly omitted or changed without departing from the spirit of the present invention.

REFERENCE SIGNS LIST 1, 1A, 1B, 1C, 1D, 1E robot control device; 2 robot; 3 robot joint angle measuring device; 3a robot joint angle signal; 4 worker measuring device; 4a position information; 5 work process specifying device; 5a work process specifying signal; 6, 61 workbench; 7 worker; 10 safety fence; 11 entry detection device; 12 estimated route corresponding to current work process; 13 estimated route corresponding to subsequent work process; 14 current work area; 15 subsequent work area; 81, 82, 83, 84, 85 work object; 101 worker measuring unit; 101a worker state information; 102, 102E robot control state measuring unit; 102a robot control state information; 104, 104B, 104D work area setting unit; 104a work area information; 104b subsequent work area information; 105, 105A, 105B, 105C robot command generator; 105a motion command; 106 entry judgment unit; 106a entry judgment signal; 107, 107A, 107C motion command output unit; 108 evacuation trajectory generator; 108a evacuation trajectory information; 109 work area storage unit; 109a correction work area information; 110 work area correcting unit; 110a corrected work area information; 111 work area output unit; 701 head; 702 neck; 703 shoulder; 704 spine; 705 hip; 706 knee; 707 ankle; 708 elbow; 709 wrist; 710 finger; 711 toe; 721, 722, 723, 724, 725, 726, 727, 728, 729, 730 bony part.

The invention claimed is:

1. A robot control device to control a robot that operates while sharing a work space with a worker who carries out one or more work processes each having a preset work content, the robot control device comprising:
   a robot control state measurer to measure a robot control state indicative of a position and a posture of the robot;
   a work area setter to prestore, for each of the work processes, data indicative of a work area that is defined by work movement of the worker throughout each of the work processes and includes a space that a body of the worker occupies and to set the work area corresponding to the work process currently carried out by the worker on a basis of the data and a work process specifying signal specifying the work process currently carried out by the worker; and
   a robot command generator to generate a motion command for the robot on the basis of the work area and the robot control state,
   wherein the robot command generator varies the motion command for the robot on the basis of whether the robot is present in the work area,
   the work area setter stores, in addition to the work area for the work process, a subsequent work process of the work processes and sets a subsequent work area corresponding to the subsequent work process in addition to setting of the work area corresponding to the work process currently carried out by the worker, and
   the robot command generator varies a way of evacuation from the work area and the subsequent work area in accordance with when the robot enters the work area and when the robot enters the subsequent work area and does not enter the work area.

2. The robot control device according to claim 1, wherein the robot command generator outputs the motion command to the robot to effect evacuation of the robot from the work area when the robot is present in the work area.

3. The robot control device according to claim 1, wherein the robot command generator effects evacuation of the robot from the subsequent work area without effecting entry of the robot into the work area when the robot enters the subsequent work area and does not enter the work area.

4. A robot control device to control a robot that operates while sharing a work space with a worker who carries out one or more work processes each having a preset work content, the robot control device comprising:
   a worker measurer to measure a worker state indicative of a position and a posture of the worker;
   a robot control state measurer to measure a robot control state indicative of a position and a posture of the robot;
   a work area setter to prestore, as a work area, data indicative of an area that is defined by work movement of the worker throughout each of the work processes and includes a space that a body of the worker occupies and to set the work area corresponding to the work process currently carried out by the worker on a basis of the data and a work process specifying signal specifying the work process currently carried out by the worker; and
   a robot command generator to generate a motion command for the robot on the basis of the work area, the worker state, and the robot control state, wherein the robot command generator varies the motion command for the robot on the basis of a determination of whether the robot enters the work area, the work area setter stores, in addition to the work area for the work process, a subsequent work process of the work processes and sets a subsequent work area corresponding to the subsequent work process in addition to setting of the work area corresponding to the work process currently carried out by the worker, and the robot command generator varies a way of evacuation from the work area and the subsequent work area in accordance with when the robot enters the work area and when the robot enters the subsequent work area and does not enter the work area.

5. The robot control device according to claim 4, wherein: the work area setter includes a work area corrector; and the work area corrector corrects the work area in storage on the basis of the work area corresponding to the work process specified by the work process specifying signal and the worker state that is input from the worker measurer.

6. The robot control device according to claim 1, wherein the robot control state measurer measures the robot control state on the basis of the motion command that is output from the robot command generator to the robot.

7. The robot control device according to claim 2, wherein the robot control state measurer measures the robot control state on the basis of the motion command that is output from the robot command generator to the robot.

8. The robot control device according to claim 3, wherein the robot control state measurer measures the robot control state on the basis of the motion command that is output from the robot command generator to the robot.

9. The robot control device according to claim 4, wherein the robot control state measurer measures the robot control state on the basis of the motion command that is output from the robot command generator to the robot.

10. The robot control device according to claim 5, wherein the robot control state measurer measures the robot control state on the basis of the motion command that is output from the robot command generator to the robot.

11. A robot control device to control a robot that operates while sharing a work space with a worker who carries out one or more work processes each having a preset work content, the robot control device comprising:

processing circuitry configured as a robot control state measurer to measure a robot control state indicative of a position and a posture of the robot;

the processing circuitry further configured as a work area setter to prestore, for each of the work processes, data indicative of a work area that is defined by work movement of the worker throughout each of the work processes and includes a space that a body of the worker occupies and to set the work area corresponding to the work process currently carried out by the worker on a basis of the data and a work process specifying signal specifying the work process currently carried out by the worker; and the processing circuitry further configured as a robot command generator to generate a motion command for the robot on the basis of the work area and the robot control state, wherein the robot command generator varies the motion command for the robot on the basis of whether the robot is present in the work area, the work area setter stores, in addition to the work area for the work process, a subsequent work process of the work processes and sets a subsequent work area corresponding to the subsequent work process in addition to setting of the work area corresponding to the work process currently carried out by the worker, and the robot command generator varies a way of evacuation from the work area and the subsequent work area in accordance with when the robot enters the work area and when the robot enters the subsequent work area and does not enter the work area.

12. A robot control device to control a robot that operates while sharing a work space with a worker who carries out one or more work processes each having a preset work content, the robot control device comprising:

a worker measurer to measure a worker state indicative of a position and a posture of the worker;

a robot control state measurer to measure a robot control state indicative of a position and a posture of the robot;

a work area setter to prestore, as a work area, data indicative of an area that is defined by work movement of the worker throughout each of the work processes and includes a space that a body of the worker occupies and to set the work area corresponding to the work process currently carried out by the worker on a basis of the data and a work process specifying signal specifying the work process currently carried out by the worker; and a robot command generator to generate a motion command for the robot on the basis of the work area, the worker state, and the robot control state, wherein the robot command generator varies the motion command for the robot on the basis of a determination of whether the robot enters the work area, when the robot enters the work area, the robot command generator sets a limiting value on an operating speed of the robot on the basis of the worker state and the robot control state, the limiting value decreasing with an increase in relative speeds of the worker and the robot within a shortest distance between the worker and the robot.

* * * * *